United States Patent [19]
Fevre

[11] 3,757,905
[45] Sept. 11, 1973

[54] BRAKING ARRANGEMENT FOR A ROTATABLE BODY MOUNTED ON FLUID BEARINGS

[75] Inventor: Charles M. Fevre, Lyon, France

[73] Assignee: Societe Stephanoise de Constructions Mecaniques, Saint-Etienne, France

[22] Filed: Apr. 20, 1971

[21] Appl. No.: 135,572

[30] Foreign Application Priority Data
Apr. 21, 1970 France .............................. 7014460

[52] U.S. Cl. ............................................... 188/170
[51] Int. Cl. ........................................... F16d 65/20
[58] Field of Search ................. 188/74, 170; 308/9, 308/DIG. 1

[56] References Cited
UNITED STATES PATENTS

| | | |
|---|---|---|
| 3,137,531 | 6/1964 | Herrmann et al....................... 308/9 |
| 2,710,234 | 6/1955 | Hansen .................................... 308/9 |
| 2,932,542 | 4/1960 | Smith...................................... 308/9 |
| 2,295,196 | 9/1942 | Barr..................................... 188/170 |
| 1,637,025 | 7/1927 | McCormick........................ 188/170 |
| 1,894,434 | 1/1933 | Williamson ......................... 188/170 |
| 3,478,341 | 11/1969 | Trimble et al. ..................... 308/9 X |

*Primary Examiner*—Evon C. Blunk
*Assistant Examiner*—W. Scott Carson
*Attorney*—John Lezdey

[57] ABSTRACT

A braking arrangement for a rotatable body mounted on fluid bearings comprising a braking lining shoe or pad whereof the movements relative to a cylindrical part of the body is controlled by a spring or the like and a fluid jack or the like. The spring tends to urge the brake lining against the cylindrical part of the body while the fluid jack tends to move the brake lining away from the cylindrical part of the body. When the fluid bearings are not supplied with fluid the spring urges the brake lining against the cylindrical part of the body.

2 Claims, 3 Drawing Figures

BRAKING ARRANGEMENT FOR A ROTATABLE BODY MOUNTED ON FLUID BEARINGS

This invention relates to braking devices.

Devices are known for braking bodies supported in bearings, fixed to a frame and rotated in these bearings by means known per se. In certain, particular cases, bearings of the air-cushion type are employed. More generally, however, bearings of the fluid type are employed in order to obtain high rotational speeds without excessive friction.

It is for this reason, in particular, that high-speed stranding machines are known, which are constituted by a plurality of tubular sections, each of them being preferably supported on air-cushion bearings.

In the general case of such bodies supported by fluid bearings, it is of the greatest advantage to ensure that the body never comes to rest on the rigid structure of the fluid bearings during its rotation. It can also be said that it is desirable that, in the case of a stoppage of the supply of fluid under pressure to the fluid bearings, the braking device stops the rotation of the body and acts, either by itself, or jointly with another device, to prevent the body from resting on the rigid structure of the fluid bearings, which are no longer supplied with fluid under pressure.

At present, although there is a demand for such a safety device, no technically valid and simple solution has been proposed. The Applicants intend to remedy this and, for this purpose, have produced the improved braking device, which is the object of the invention.

According to the present invention there is provided for a body supported in or on fluid bearings connected to a supply of fluid under pressure and fixed to a frame, at least one braking device and rotational drive means, the braking device comprising a brake lining, shoe or pad mounted to move relative to a cylindrical part of the body, the position of this lining shoe or pad being determined by the opposing actions of an elastic or resilient member, which tends to urge the lining shoe or pad against the cylindrical part of the body, and a control member, operable by fluid under pressure, which tends to separate the lining shoe or pad from the body.

In the absence of fluid under pressure in the bearings, the elastic or resilient member effectively urges the brake lining, shoe or pad against the cylindrical part of the body.

Moreover, since the bearings supporting the body are preferably located at the periphery of the lower semi-circumference of the cylindrical part of the body, substantially symmetrically relative to the vertical plane passing through the axis of this cylindrical part, the brake lining, shoe or pad is itself also located at the periphery of the lower semi-circumference of the cylindrical part of the body, substantially symmetrically relative to the vertical plane passing through the axis of this cylindrical part, and in the absence of fluid under pressure in the bearings, the elastic or resilient member elevates the brake lining shoe or pad and by this means, also raises the body of the bearings not supplied with fluid under pressure.

The brake lining, shoe or pad, is advantageously fixed to a support mounted to pivot about an axis parallel to the axis of the cylindrical part of the body and maintained in position under the opposing actions of an elastic or resilient member connected between the frame and the support, and a control jack operable by fluid under pressure, the action of the said elastic or resilient member tending to urge the lining, shoe or pad against the cylindrical part of the body.

The invention is applicable in particular to the case where the fluid bearings are constituted by bearings with cushions of compressed gas and is advantageously used in a sectionalised tubular stranding machine.

An embodiment of the present invention will now be described, by way of example, with reference to the accompanying drawings, in which.

Figure 1:
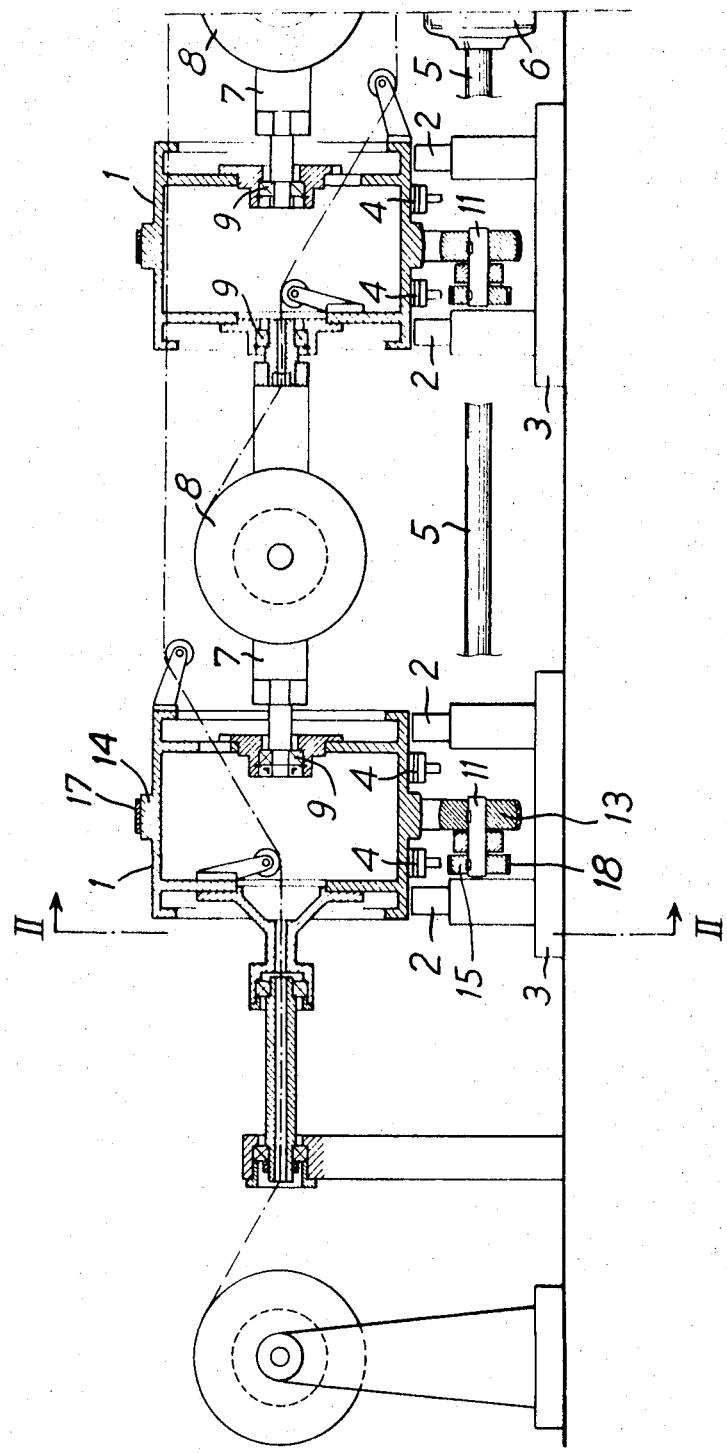
FIG. 1 is a part-sectional elevation of a stranding machine employing the present invention.
Figure 2:
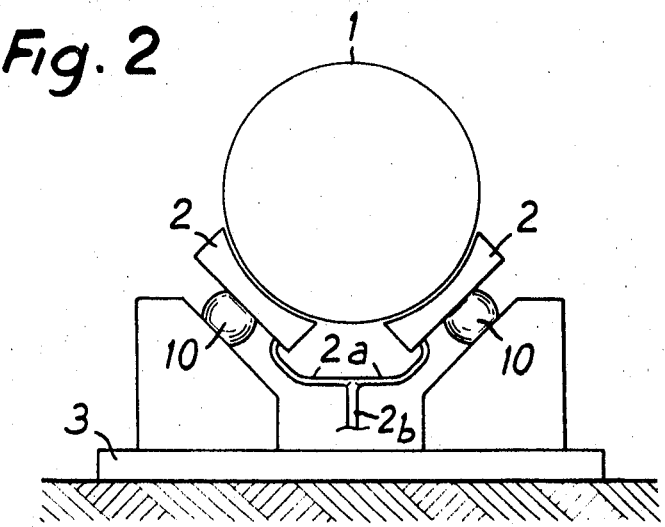
FIG. 2 is a section on the line II—II of FIG. 1.

The stranding machine comprises a plurality of tubular sections 1 which are located substantially coaxially to each other and are longitudinally spaced. Each tubular section 1 is supported on bearings 2 fixed to the frame 3 of the stranding machine. Elastic or resilient cushions 10 are interposed between each bearing 2 and the frame 3. The bearings 2 are grouped in pairs the two bearings of one group being located substantially symmetrically relative to the vertical, longitudinal plane passing through the axis of the tubular sections 1. These bearings 2 are of the air-cushioned type and are connected by pipes 2a to a main pipe 2b supplying the air or other fluid under pressure.

Brake linings, shoes or pads 4 are provided, in known manner, for each tubular section 1. The drive for the tubular sections comprises a main drive shaft 5 which extends parallel to the axes of the tubular sections along the stranding machine and which is coupled to drive motor 6. Also in known manner, cradles 7 for bobbins or spools 8 rest in bearings 9 integral with the tubular sections 1. It is not necessary to describe in detail the other standard parts of the stranding machine which a man skilled in the art would recognise without difficulty from the drawings.

However, it can be stated that, as regards the drive of the tubular sections 1, a secondary shaft 11 is provided for each tubular section 1. Four pulleys are respectively provided, the pulleys 13 and 15 on the secondary shaft 11, the pulley 14 on each tubular section 1, opposite the pulley 13 and a fourth pulley (not shown) on the main shaft 5, opposite the pulley 15. A drive belt 17 connects the pulleys 13 and 14 and a drive belt 18 connects the pulley 15 and the fourth pulley.

Figure 3:
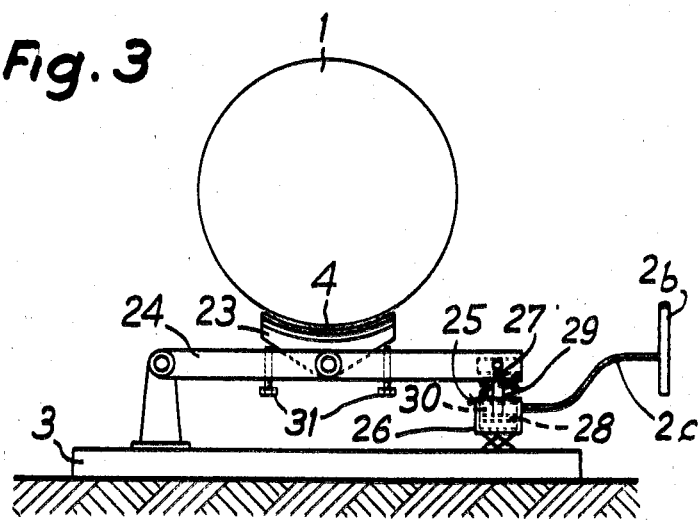
FIG. 3 is a view illustrating the particular arrangement of a brake of the stranding machine of FIG. 1 and FIG. 2.

As regards the mounting of each brake lining, shoe or pad 4, reference is made to FIG. 3 on which it will be noted that the lining 4 is mounted to move relative to the cylindrical part of a tubular section 1. More precisely, this lining 4 is fixed to a support 23 pivoted on a lever 24, pivoted on the frame 3, the pivot points of the support 23 and of the lever 24 being substantially parallel to the axis of the tubular section 1. It will be seen that two substantially vertical screws 31, located on either side of the pivot axis of the support 23, have their ends very near to this support 23 and thus limit the displacement of the support 23 while providing play for the engagement of the lining 4 with the tubular section 1 at the time of braking. In this way, at the beginning of braking, the tubular section 1 can neither tilt nor come into contact with the bearings.

A jack 25 is connected between the end of the lever 24 opposite the pivot point of the lever and the frame 3. The body 26 of the jack 25 is connected to the frame 3 and the rod 27 of the piston 28 of the jack 25 is attached to the lever 24. Moreover, a spring 29 is interposed between the lever 24 and the body 26 of the jack or, more generally, between the lever 24 and the frame 3, and tends to push the lining 4 against the tubular section 1, the upper chamber 30 of the jack 25 being connected by a pipe 2c to the main pipe 2b for supplying fluid under pressure.

It will be noted that, in the absence of fluid under pressure in the chamber 30, the force of the spring 29 allows the latter to push the lining 4 against the tubular section 1 thus to raise the section 1 off the fluid bearings 2. On the other hand, when the chamber 30 is supplied with fluid under pressure, the force which acts on the piston 28 is sufficiently great for compressing the spring 29 and removing the lining 4 from the tubular section 1, the latter thus resting on its bearings 2. Incidentally, it will be noted that the brake lining 4 is located substantially symmetrically relative to the longitudinal, vertical plane passing through the axis of the section 1.

Naturally, variations may be applied to the embodiment which has been described, without diverging from the scope of the claimed invention.

Amongst other variations, it will be noted that the invention can be applied to any body mounted to rotate in fluid bearings, whether this body is or is not, a tubular section 1 of a stranding machine, whether the fluid bearings are, or are not, air-cushioned bearings. Moreover, it is understood that the operation which will be described of the afore-described stranding machine, may also have variations according to the invention. In particular, the cut-off of the supply to the bearings 2 of the fluid under pressure may advantageously be connected to the cut-off of the rotational drive of the various sections, and for example, to the control for stopping the motor 6.

The advantage of using the braking arrangement which has been described are considerable. In fact, when the pipe 2b is supplied with fluid under pressure, the tubular sections 1 are supported on their fluid bearings 2 and are released from the brake linings 4. These sections 1 may thus be freely rotated on their bearings 2, by a drive device as described. On the other hand, if a cut-off of the supply to the bearings 2 of fluid under pressure is effected, the springs 29 immediately press the brake linings 4 against the sections 1 and release the sections from the rigid structure of the bearings, although the fluid bearings no longer act to support these sections 1. There is thus avoided the cut-off of the supply of fluid under pressure either desired or accidental, the deterioration of the surfaces supporting the sections in the bearings 2, a deterioration which could cause friction on the said surfaces on the rigid structures of the fluid bearings.

It will be noted that since the bearings 2 and the jack 25 are supplied from the same pipe 2b, the fall in pressure in the fluid bearings accompanies the release of the tubular sections 1 from their bearings 2 under the action of the spring 29 which is no longer kept compressed by the jack 25.

In addition, it will be easily understood that the assembly of the brake linings 4 may have many variations. In particular, this is why with the preceding safety device there may be combined a standard arrangement which makes it possible to actuate the linings 4 independently of the supply of fluid under pressure to the bearings 2. This standard arrangement provides the possibility of braking the sections 1, even though the latter are driven and, for example, of decreasing their speed of rotation without stopping them completely.

In addition, the secondary shaft 11 has been mounted to rotate in a hanger with bearings and is itself mounted to pivot about the axis of the main shaft 5. In order to make the braking force independent of the weight of the section 1, there has been provided an abutment for limiting the vertical displacement of the hanger and thus the vertical displacement of the secondary shaft and of the section 1 by means of the belt 17.

What is claimed is:

1. A braking arrangement for controlling rotation of a cylindrical body comprising a rotatable cylindrical body, means for rotating said cylindrical body about its axis, fluid bearings for rotatably supporting said cylindrical body, a source of fluid under pressure connected to said fluid bearings, at least one braking device, each having a braking pad for engaging said cylindrical body, said at least one braking device and said fluid bearings being disposed about the lower semi-circumference of said cylindrical body and symmetrically arranged with respect to a vertical plane passing through the axis of said cylindrical body, resilient means for normally urging said braking pad against the cylindrical body to control the speed of rotation thereof, means connecting said source of fluid pressure to said at least one braking device, and means for controlling the supply of fluid under pressure to said fluid bearings and said at least one braking device, whereby when fluid under pressure passes to said fluid bearings and said braking device, said rotatable cylindrical body will be rotatably supported and said brake pad will be disengaged from said cylindrical body against the force of said resilient means and in the absence of fluid under pressure thereto, said fluid bearings will not support said cylindrical body and said braking pad will be urged by said resilient means to engage and support said cylindrical body to prevent said cylindrical body from directly engaging and damaging said fluid bearings.

2. An arrangement as claimed in claim 1 wherein said at least one braking device includes support means for said braking pad, means for pivotally mounting said support means about an axis parallel to the axis of said cylindrical body and a jack means operable by said source of fluid under pressure for rotating said support means to release said braking pad from said cylindrical body against the force of said resilient means.

* * * * *